(12) United States Patent
Wendling et al.

(10) Patent No.: US 7,884,715 B2
(45) Date of Patent: Feb. 8, 2011

(54) METHOD AND SYSTEM FOR PROGRAM EXECUTION INTEGRITY FOR COMMUNICATION-BASED ANGLE SENSOR

(75) Inventors: Scott M. Wendling, Montrose, MI (US); Terrence D. Smith, Bay City, MI (US); Jeffrey T. Klass, Kawkawlin, MI (US); Takashi Miyano, Tachikawa (JP)

(73) Assignee: Nexteer (Beijing) Technology Co., Ltd.

( * ) Notice: Subject to any disclaimer, the term of this patent is extended or adjusted under 35 U.S.C. 154(b) by 1953 days.

(21) Appl. No.: 10/910,954

(22) Filed: Aug. 4, 2004

(65) Prior Publication Data

US 2006/0061355 A1 Mar. 23, 2006

(51) Int. Cl.
*G08B 1/08* (2006.01)
(52) U.S. Cl. .................. 340/539.24; 340/506; 340/507; 340/671; 340/465; 714/712; 714/759; 702/81; 702/109; 375/224; 375/227; 375/228
(58) Field of Classification Search .................. 340/465, 340/425.5, 506, 507, 539.22–525.26, 671, 340/870.01; 702/81, 109–111, 182–186; 714/712, 759; 375/224, 227–228
See application file for complete search history.

(56) References Cited

U.S. PATENT DOCUMENTS

| | | | | |
|---|---|---|---|---|
| 4,970,638 A | * | 11/1990 | Yeh et al. | 700/30 |
| 5,072,358 A | * | 12/1991 | Lankford | 700/73 |
| 5,257,210 A | * | 10/1993 | Schneider et al. | 702/109 |
| 5,750,908 A | * | 5/1998 | Drohan | 73/865.9 |
| 5,991,840 A | * | 11/1999 | Suzuki | 710/300 |
| 6,588,540 B2 | | 7/2003 | Graber et al. | |
| 6,648,096 B2 | | 11/2003 | Berg et al. | |
| 6,650,979 B1 | | 11/2003 | Kreft | |
| 6,952,443 B1 | * | 10/2005 | Kong et al. | 375/225 |
| 7,131,046 B2 | * | 10/2006 | Volkerink et al. | 714/732 |
| 7,444,020 B2 | * | 10/2008 | Loew | 382/181 |
| 2002/0050931 A1 | | 5/2002 | Lieberman et al. | |
| 2002/0056056 A1 | | 5/2002 | Bannatyne et al. | |
| 2003/0040878 A1 | | 2/2003 | Rasmussen et al. | |
| 2003/0102959 A1 | | 6/2003 | Bitzer | |
| 2003/0216879 A1 | | 11/2003 | Hashemian | |
| 2004/0046112 A1 | | 3/2004 | Durocher | |
| 2005/0007096 A1 | * | 1/2005 | Dimino et al. | 324/142 |

* cited by examiner

*Primary Examiner*—Benjamin C Lee
(74) *Attorney, Agent, or Firm*—Cantor Colburn LLP

(57) ABSTRACT

A method for implementing program execution integrity (PEI) for a communication-based sensor includes receiving an output communication message from the sensor, the output communication message including sensor output data internally processed within the sensor. The output communication message further includes raw data used by the sensor in internally processing the sensor output data. The raw data is independently processed, and the results thereof are compared with the internally processed sensor output data so as to verify the processing integrity of the sensor to a desired tolerance.

18 Claims, 4 Drawing Sheets

METHOD AND SYSTEM FOR PROGRAM EXECUTION INTEGRITY FOR COMMUNICATION-BASED ANGLE SENSOR

BACKGROUND

The present invention relates generally to redundant system diagnostic techniques and, more particularly, to a method and system for program execution integrity for a communication-based angle sensor.

Modern vehicles are increasingly equipped with sophisticated electronic control systems for achieving finer control. For example, "steer-by-wire" is one type of control system in which a conventional direct mechanical linkage between the input device (e.g., steering wheel or handwheel) and the output device (e.g., steered road wheel) is replaced with a system incorporating components such as electronic input sensors, control circuitry, and output actuators. In particular, a system such as steer-by-wire (as well as other types of steering systems) utilizes a steering wheel angle sensor input for the operation thereof.

As is the case with many systems utilizing steering wheel angle information, the components of (and data produced by) the system are designed to be robust (i.e., redundant) so as to be able to continue system operation or fail safe in the event of a failure of one or more of the components. One way to ensure the robustness of a system component, such as a steering wheel position sensor, is by providing redundant components and/or signals in the system. However, this solution may not necessarily be cost effective or practical, depending on the system/component involved. With other approaches to ensuring system robustness, the system itself may be designed to verify the accuracy of sensor inputs, as well as the program execution integrity (PEI) of processing algorithms associated with the system. Examples of PEI diagnostics can include, but are not necessarily limited to, checksums, micro COP faults, redundant ALU, and runtime memory checks.

There are several different technologies available for sensing the steering angle of a vehicle, one of which utilizes a communication-based sensor. This type of sensor operates by transmitting a steering wheel angle message on a vehicle communication bus, which in turn provides a means for each module coupled to the bus to receive and utilize the information as necessary. In other words, the output of a conventional communication-based sensor is an actual computed parameter that is directly utilized by the system(s) receiving such information, as opposed to "raw" sensor data that is thereafter processed by the requesting system to compute the particular parameter. Thus, a communication-based sensor typically includes components such as individual sensing elements, a microprocessor, a communication controller and transceiver to interface with a communication medium (e.g., a vehicle communications bus).

Unfortunately, not all communication-based sensors process the raw data with the same degree of rigorousness and verification. When a robustly designed system uses information sent by a communication-based sensor, the information generated by the sensor should also meet the PEI criteria, input verification criteria and diagnostic timing requirements as do the rest of the system components. Accordingly, it would be desirable to be able to improve the reliability of information generated by existing communication-based sensors to meet robust system design criteria.

SUMMARY

The foregoing discussed drawbacks and deficiencies of the prior art are overcome or alleviated by a method for implementing program execution integrity (PEI) for a communication-based sensor. In an exemplary embodiment, the method includes receiving an output communication message from the sensor, the output communication message including sensor output data internally processed within the sensor. The output communication message further includes raw data used by the sensor in internally processing the sensor output data. The raw data is independently processed, and the results thereof are compared with the internally processed sensor output data so as to verify the processing integrity of the sensor to a desired tolerance.

In another embodiment, a system for implementing program execution integrity (PEI) for a communication-based sensor includes a control unit in communication with the sensor and configured to receive an output communication message therefrom. The output communication message includes sensor output data internally processed within the sensor, the output communication message further including raw data used by the sensor in internally processing the sensor output data. The control unit is further configured for independently processing the raw data, and for comparing the results of the independently processed raw data with the internally processed sensor output data so as to verify the processing integrity of the sensor to a desired tolerance.

In still another embodiment, a storage medium includes a machine readable computer program code for implementing program execution integrity (PEI) for a communication-based sensor, and instructions for causing a computer to implement a method. The method further includes receiving an output communication message from the sensor, the output communication message including sensor output data internally processed within the sensor. The output communication message further includes raw data used by the sensor in internally processing the sensor output data. The raw data is independently processed, and the results thereof are compared with the internally processed sensor output data so as to verify the processing integrity of the sensor to a desired tolerance.

BRIEF DESCRIPTION OF THE DRAWINGS

Referring to the exemplary drawings wherein like elements are numbered alike in the several Figures.

DETAILED DESCRIPTION

Disclosed herein is a method and system for program execution integrity (PEI) for a communication-based sensor. Briefly stated, the raw data generated by sensing elements within the sensor is independently processed by a separate control unit and then compared with the sensor's output message data processed internally within the sensor. So long as the sensor output message data is in agreement with the independently computed data (to a specified tolerance), the sensor is deemed to have correctly internally processed its own raw data, thereby satisfying the PEI of the sensor.

In an exemplary embodiment, the communication-based sensor is a steering angle sensor that provides an absolute angle as its output to a vehicle communication bus. A separate control unit provides a means for verifying the sensor's PEI such the sensor itself need not be designed according to the same diagnostic timing requirements as the vehicle system using the steering angle information.

Figure 1:
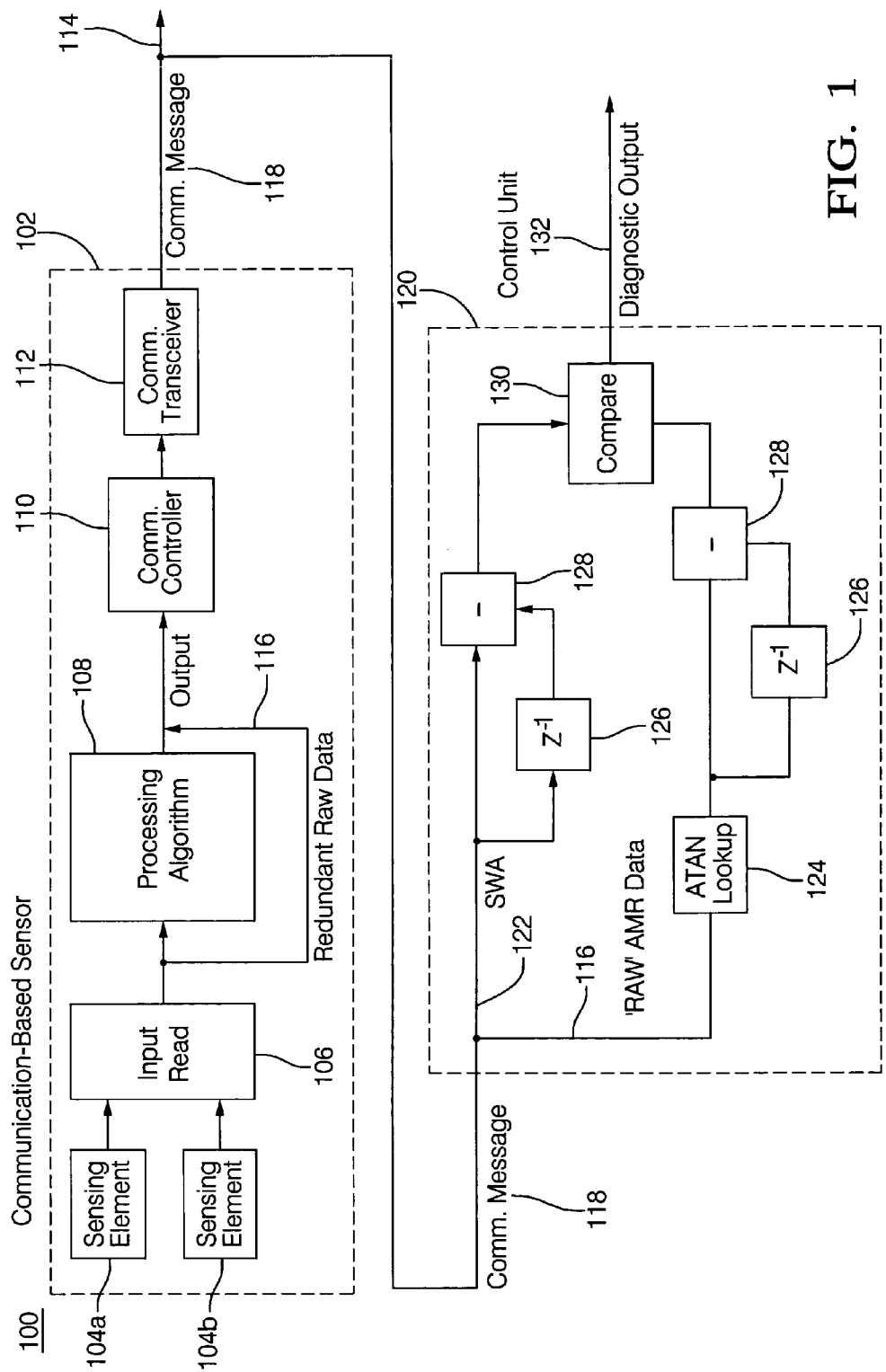
FIG. 1 is a schematic block diagram illustrating a system and method for implementing a program execution integrity (PED) diagnostic for a communication-based sensor, in accordance with an embodiment of the invention.

Referring initially to FIG. 1, there is shown a schematic block diagram illustrating a system and method 100 for implementing program execution integrity (PEI) for a communication-based sensor, in accordance with an embodiment of the invention. As is shown, the exemplary communication-based sensor 102 is a steering angle sensor and includes a pair of sensing elements 104a, 104b that generate analog voltage inputs received and read by a processor 106. The processor 106 may include an analog to digital conversion (ADC) mechanism for providing raw, unprocessed digital data in the form of sine and cosine values. The raw sine and cosine values are then processed in accordance with an internal processing algorithm 108 of the sensor 102.

The output of processing algorithm 108 represents the actual, absolute steering wheel angle information used by one or more vehicle control systems in communication with the vehicle communication bus. Accordingly, a communication controller 110 and associated transceiver 112 provide an appropriate hardware interface to the vehicle communication bus 114. In a conventionally configured communication-based steering angle sensor, only the processed steering angle data is communicated externally from the sensor. However, as further shown in FIG. 1, sensor 102 is modified so as to also redundantly provide the raw, unprocessed data 116 as part of its output communication message 118.

As indicated previously, the desired program execution integrity is implemented through a separate control unit 120. Depending upon the particular application for the steering angle data, control unit 120 could be included as part of an existing vehicle control system controller, or it could be a separate control function altogether. In any case, control unit 120 receives the output communication message 118 from sensor 102 and separates the absolute steering wheel angle (SWA) data 122 from the raw data 116. The raw data 116 (sine and cosine signals) is inputted to an inverse tangent function block (ATAN) 124 that, in addition to implementing an arc tangent lookup function, provides overflow detection and rotation detection for providing an independently processed steering angle, described in further detail hereinafter.

In the embodiment depicted, the actual comparison between the sensor-computed steering angle and the independently computed steering angle is a comparison between differential values of the two. Thus, for each signal path in control unit 120 there is provided a delay block 126 and a subtraction block 128. A compare block 130 receives a first differential value representing the change in sensor-computed steering angle and a second differential value representing the change in the independently computed steering angle using the raw data. A diagnostic output 132 reflects whether the difference between the sensor-computed steering angle and the independently computed steering angle exceeds a determined threshold.

Figure 2:
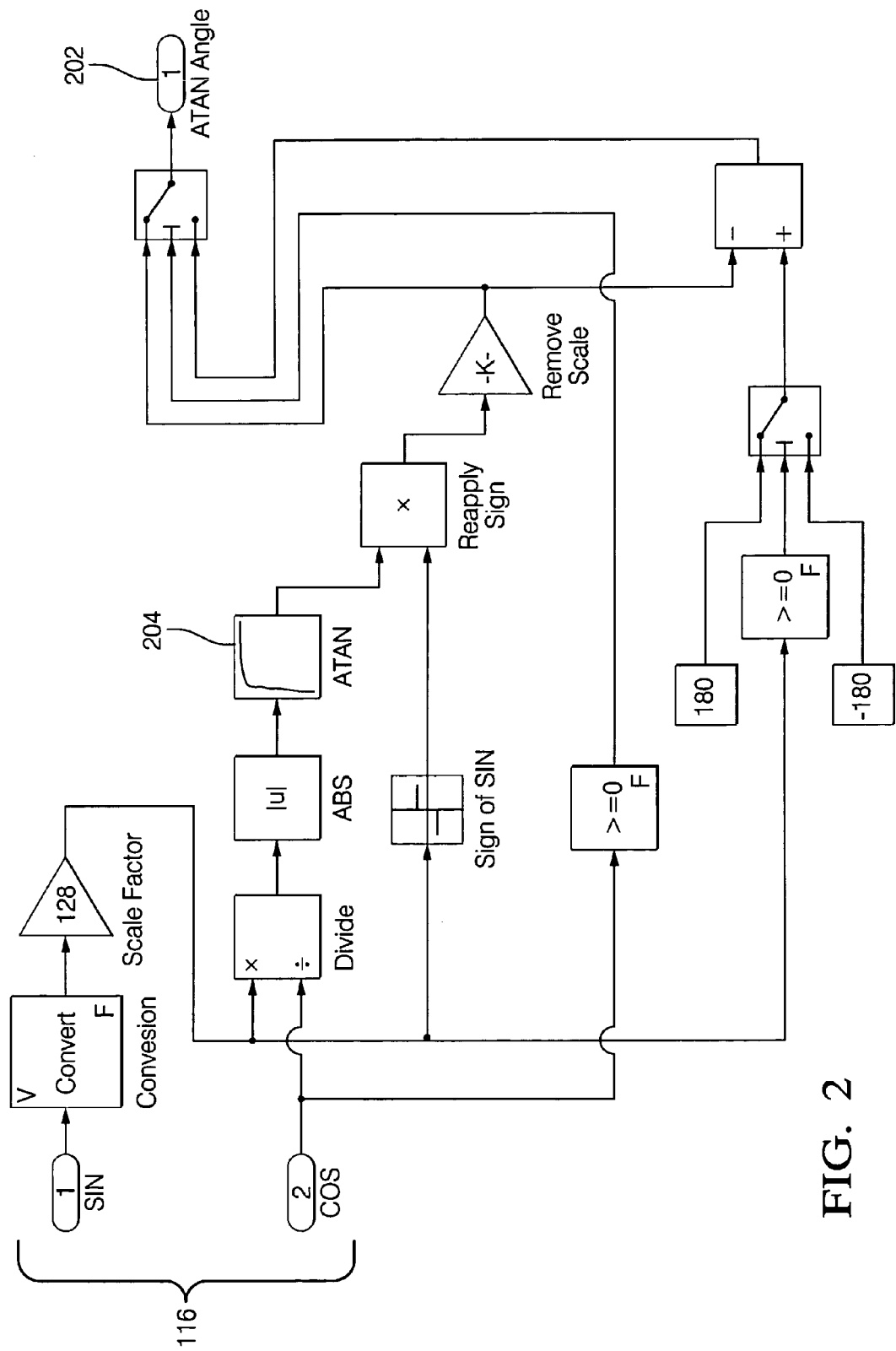
FIG. 2 is a detailed block diagram of an inverse tangent (ATAN) angle lookup function utilized by the system of FIG. 1.

FIG. 2 is a more detailed block diagram of an ATAN angle lookup portion 200 of the ATAN function block 124, particularly illustrating the sine and cosine inputs of the raw steering angle data 116 and an intermediate output (ATAN angle) 202 representing the sensor angle in degrees (±180°). In this particular example, the sine value is scaled up by a factor of 128 ($2^7$) to preserve resolution in division. An ATAN lookup table 204 provides a first quadrant angle value in order to conserve available memory, and the sign of the cosine and sine values are reapplied to provide the correct angle quadrant.

Figure 3:
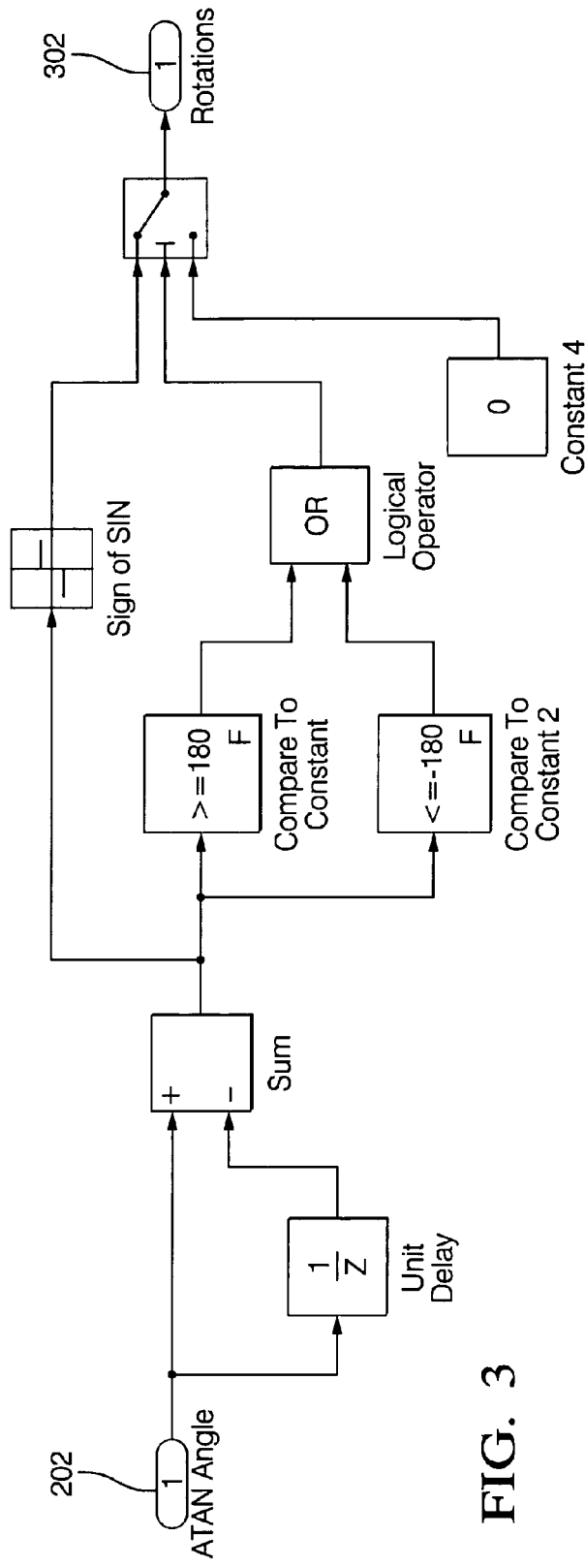
FIG. 3 is a block diagram of a rotation overflow detection function included in the inverse tangent (ATAN) angle lookup function of FIG. 2.

As shown in FIG. 3, the determined ATAN angle 202 is further inputted to a rotation overflow detection portion 300 of the ATAN function block 124, which produces an internal output 302 reflective of the direction of rotation of the steering angle. Angle changes are limited by Nyquist criteria to be less than ±180°. Any changes that are greater than 180° are considered overflows, which can either be in a clockwise direction or a counterclockwise direction. For a detected counterclockwise rotation, output 302 will have a value of 1, while for a detected clockwise rotation, output 302 will have a value of −1. Otherwise, the value of output 302 will be 0.

Figure 4:
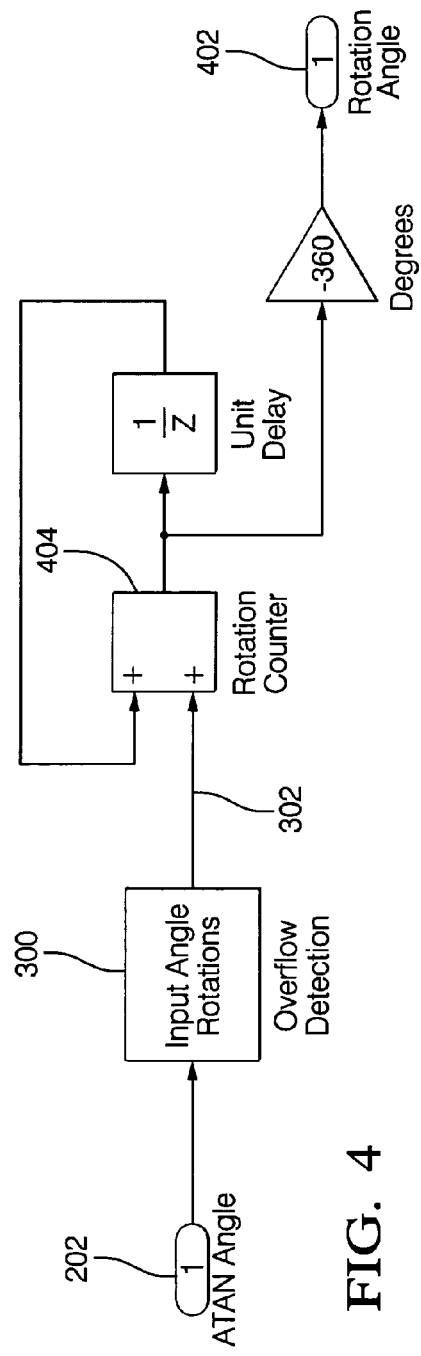
FIG. 4 is a block diagram of a rotation angle determination function included in the inverse tangent (ATAN) angle lookup function of FIG. 2, which utilizes the rotation/overflow output of FIG. 3.

Referring now to FIG. 4, there is shown another block diagram illustrating a rotation angle determination portion 400 of ATAN block 124, which utilizes the rotation/overflow output 302 of FIG. 3 (determined from ATAN angle 202) to generate a rotation angle output in degrees. In particular, a rotation counter 404 is used to sum the positive and negative rotations determined by the rotation overflow detection function 300, and this value is then multiplied by −360 degrees.

Figure 5:
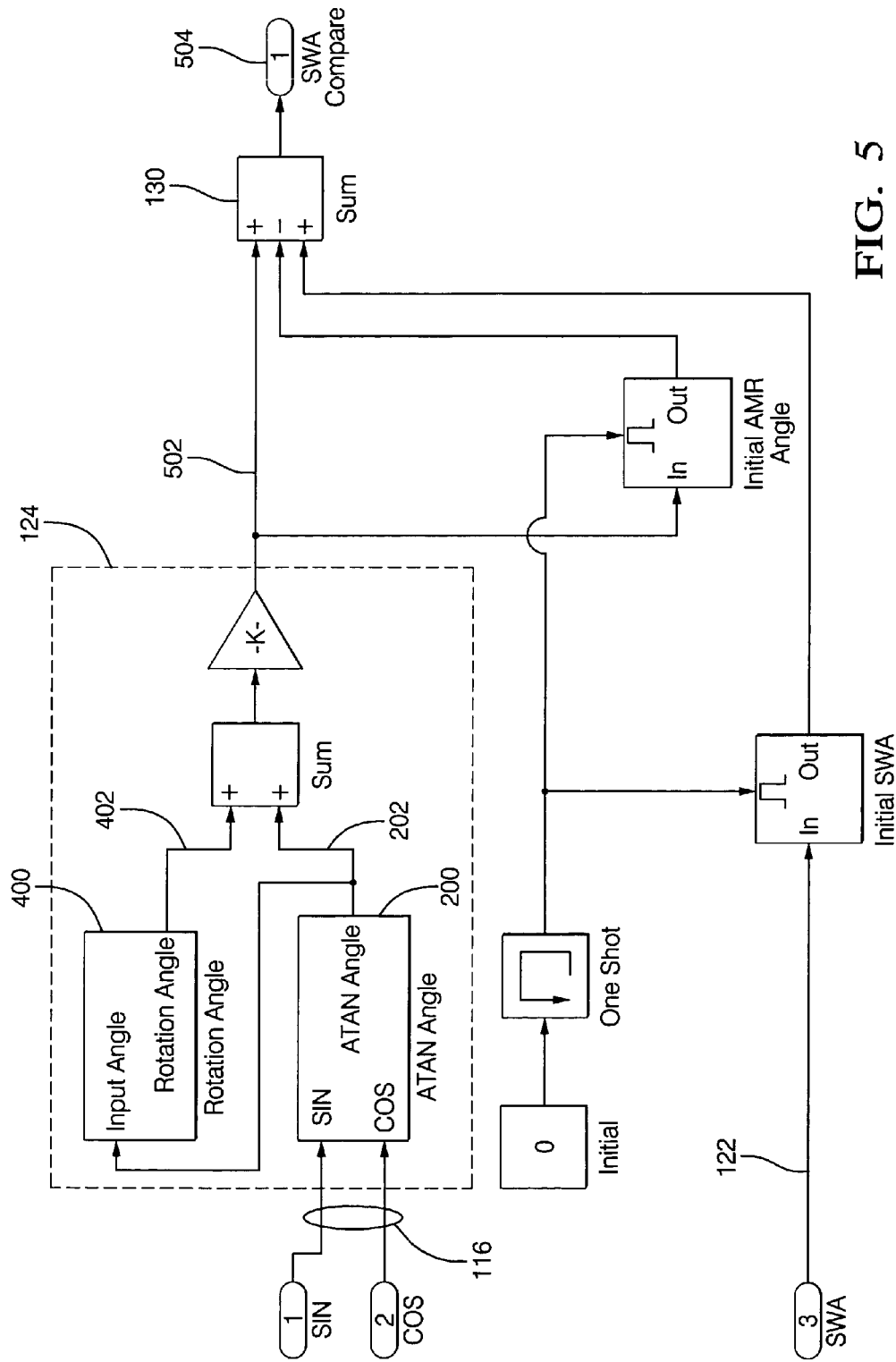
FIG. 5 is a block diagram summarizing the steering angle comparison function implemented by the control unit in FIG. 1.

Finally, FIG. 5 is another block diagram summarizing the steering angle comparison function implemented by control unit 120. Again, the raw unprocessed sensor data 116 is used to generate an independently computed, scaled steering angle 502. The scaled steering angle 502 is then subtracted from the previously determined scaled steering angle (initial AMR angle) to produce relative steering angle motion. Concurrently, the relative sensor-computed steering angle motion is determined and provided to compare block 130, thereby generating an absolute steering angle compare value 504 to be used for diagnostic purposes.

As will be appreciated, the above described method and system provides for verification of internal processing of communication-based sensor information. In the exemplary embodiments depicted, steering angle information is provided from the communication-based steering angle sensor to a vehicle a communication bus is independently verified to determine whether the sensor or module sending the angle information processed the raw sensor data correctly. Although the verification is determined by comparing the change in steering angle position, it is contemplated that the comparison may be carried out in other ways (e.g., by directly comparing current steering angles provided by the sensor and independently computed by control unit 120).

Moreover, the specific steering angle reconstruction (processing) from the raw sensor data need not necessarily carried out in the specific manner shown in the Figures, and could be implemented with the same or a different resolution than provided by the sensor's internal algorithm. Regardless of how the calculation is carried out, the present invention embodiments provide a redundant comparison of communication-based sensor information to ensure the information is compatible with robustly designed systems that use the information.

As will be also appreciated, the above described method embodiments may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to a preferred embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for implementing program execution integrity (PEI) for a communication-based sensor, the method comprising:
   receiving an output communication message from the sensor, said output communication message including sensor output data internally processed within the sensor, said output communication message further including raw data used by the sensor in internally processing said sensor output data;
   independently processing said raw data; and
   comparing the results of said independently processed raw data with said internally processed sensor output data so as to verify the processing integrity of the sensor to a desired tolerance.

2. The method of claim 1, wherein said sensor output data comprises a steering angle, and said raw data comprises sensor rotation information.

3. The method of claim 2, wherein said sensor rotation information comprises sine and cosine input values.

4. The method of claim 3, wherein said independently processing said raw data further comprises:
   using said sine and cosine input values to determine an inverse tangent angle from a lookup table;
   determining, from said inverse tangent angle, a rotation direction and a rotation angle; and
   determining, from said rotation angle and said inverse tangent angle, a scaled, independently computed steering angle.

5. The method of claim 4, further comprising an independently computed, differential steering angle with said sensor output data.

6. The method of claim 1, further comprising configuring the communication-based sensor to provide said raw data, in addition to said internally processed sensor output data, in said output communication message.

7. A system for implementing program execution integrity (PEI) for a communication-based sensor, comprising:
   a control unit in communication with the sensor and configured to receive an output communication message therefrom, said output communication message including sensor output data internally processed within the sensor, said output communication message further including raw data used by the sensor in internally processing said sensor output data;
   said control unit further configured for independently processing said raw data; and
   said control unit further configured for comparing the results of said independently processed raw data with said internally processed sensor output data so as to verify the processing integrity of the sensor to a desired tolerance.

8. The system of claim 7, wherein said sensor output data comprises a steering angle, and said raw data comprises sensor rotation information.

9. The system of claim 8, wherein said sensor rotation information comprises sine and cosine input values.

10. The system of claim 9, wherein said independently processing said raw data further comprises:
    said control unit configured to use said sine and cosine input values to determine an inverse tangent angle from a lookup table;
    said control unit configured to determine, from said inverse tangent angle, a rotation direction and a rotation angle; and
    said control unit configured to determine, from said rotation angle and said inverse tangent angle, a scaled, independently computed steering angle.

11. The system of claim 10, further comprising an independently computed, differential steering angle with said sensor output data.

12. The system of claim 8, wherein the communication-based sensor is configured to provide said raw data, in addition to said internally processed sensor output data, in said output communication message.

13. A storage medium, comprising:
    a machine readable computer program code for implementing program execution integrity (PEI) for a communication-based sensor; and
    instructions for causing a computer to implement a method, the method further comprising:
    receiving an output communication message from the sensor, said output communication message including sensor output data internally processed within the sensor, said output communication message further including raw data used by the sensor in internally processing said sensor output data;
    independently processing said raw data; and
    comparing the results of said independently processed raw data with said internally processed sensor output data so as to verify the processing integrity of the sensor to a desired tolerance.

14. The storage medium of claim 13, wherein said sensor output data comprises a steering angle, and said raw data comprises sensor rotation information.

15. The storage medium of claim 14, wherein said sensor rotation information comprises sine and cosine input values.

16. The storage medium of claim 15, wherein said independently processing said raw data further comprises:
- using said sine and cosine input values to determine an inverse tangent angle from a lookup table;
- determining, from said inverse tangent angle, a rotation direction and a rotation angle; and
- determining, from said rotation angle and said inverse tangent angle, a scaled, independently computed steering angle.

17. The storage medium of claim 16, further comprising an independently computed, differential steering angle with said sensor output data.

18. The storage medium of claim 13, further comprising configuring the communication-based sensor to provide said raw data, in addition to said internally processed sensor output data, in said output communication message.

* * * * *